Figure 1:
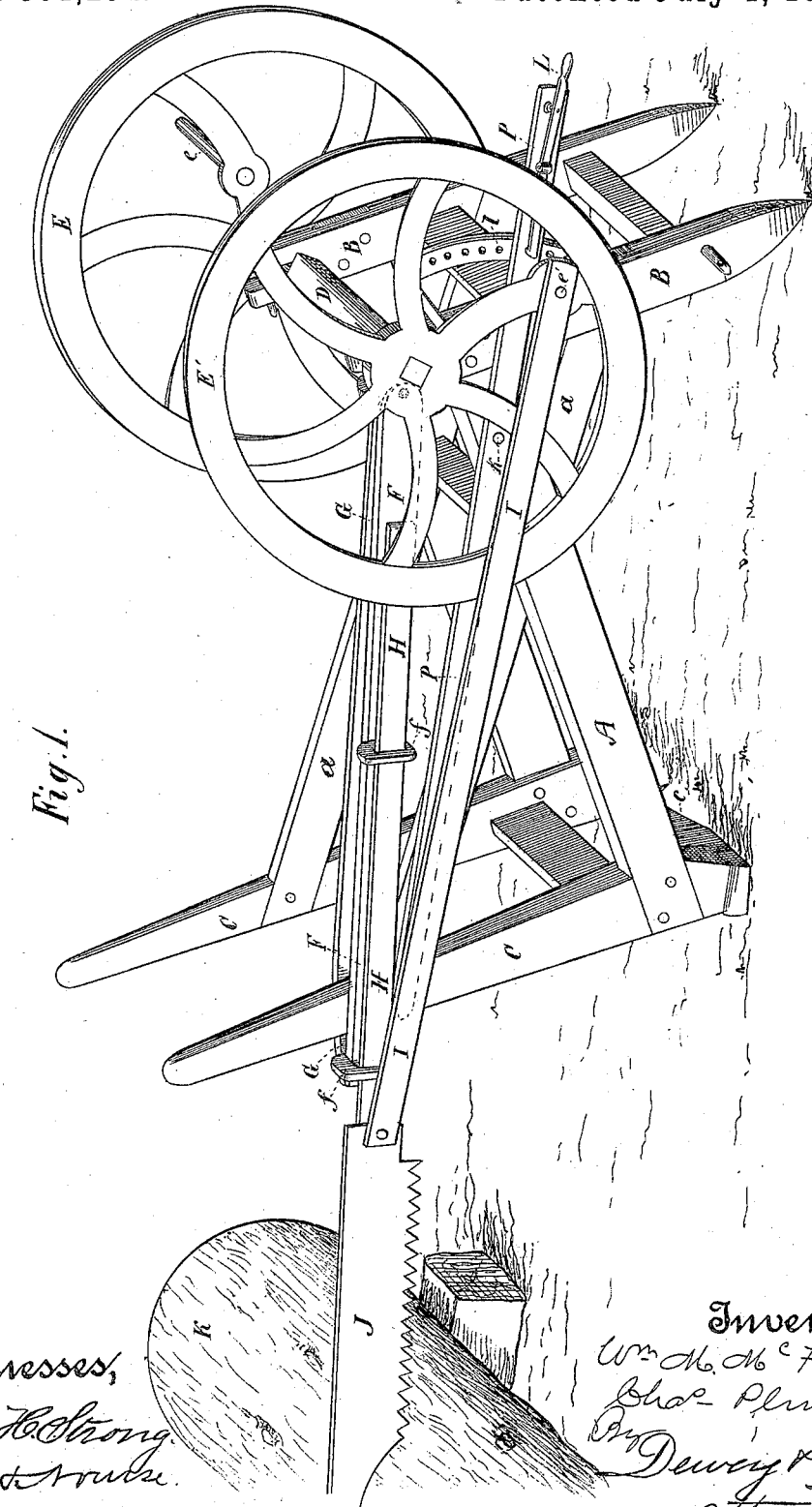

(No Model.)

W. M. McFARLIN & C. PLUM.
DRAG SAW.

No. 301,254. Patented July 1, 1884.

Witnesses,
Geo. H. Strong

Inventors,
Wm. M. McFarlin
Chas. Plum
By Dewey & Co.
attorney

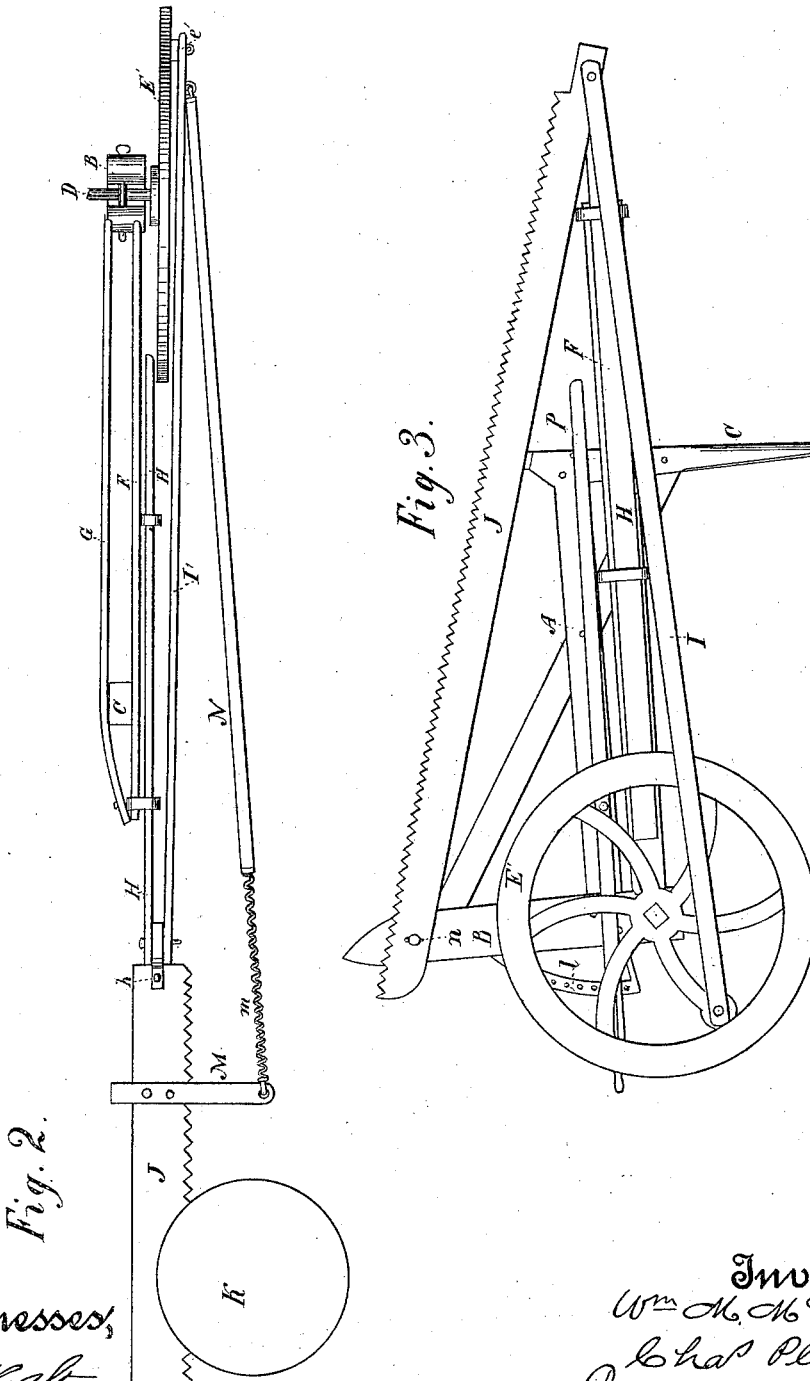

UNITED STATES PATENT OFFICE.

WILLIAM M. McFARLIN AND CHARLES PLUM, OF ONO, CALIFORNIA.

DRAG-SAW.

SPECIFICATION forming part of Letters Patent No. 301,254, dated July 1, 1884.

Application filed April 24, 1884. (No model.)

*To all whom it may concern:*

Be it known that we, WILLIAM M. McFARLIN and CHARLES PLUM, of Ono, county of Shasta and State of California, have invented an Improvement in Sawing-Machines; and we hereby declare the following to be a full, clear, and exact description thereof.

Our invention relates to a new and useful sawing-machine; and it consists in a peculiar self-supporting reversible frame, upon which are mounted two wheels, which, when the frame is upright, have the function of cranks for imparting motion, and when the frame is inverted have the function of rolling wheels for transporting the machine. With one of these wheels is connected a pitman, through which a reciprocating motion is imparted to a vertically-adjustable rod having the saw attached. The arrangement of the different parts, the means by which the inclination of the saw is varied, and the means by which it is adapted to saw standing trees as well as logs all form part of our invention and will hereinafter be fully described.

The object of our invention is to provide a simple, effective, and easily-handled machine for use in the woods, adapted to saw up fallen trees or to saw down standing ones.

Referring to the accompanying drawings, Figure 1 is a perspective view of our machine at work. Fig. 2 is a plan of a portion of the machine, showing its adaptation for cutting down standing trees. Fig. 3 is a side elevation of the machine, showing it turned over and ready for transportation.

A is a frame having rear legs, B, which rest on the ground, and handles C at the forward end, the bases of which terminate in a cross-bar, c, which also rests on the ground. Braces a join the legs and handles, making the whole frame stiff.

Mounted in the tops of the legs is a shaft, D, on the ends of which the wheels E E' are secured. The wheel E is provided with a crank-handle, e, by which power is applied to it, and the wheel E' has a crank-pin, e'.

Pivoted near the top of one of the legs B is a bar, F, which extends forward beside one of the handles, and is held to it somewhat firmly by means of a piece, G, of springy wood, which is pivoted by one end to the leg, thence passes on the other side of the handle, and is secured to the forward end of the bar. This impingement upon the handle is only sufficient to hold the bar to its place, but not great enough to prevent it from moving up and down on the handle as a guide, as we shall presently explain.

Upon the side of bar F are socket-guides f, in which a rod or bar, H, is fitted and is adapted to slide.

I is a pitman connecting the crank-pin e' of wheel E' with the forward end of rod H, whereby a reciprocating motion is imparted to said rod.

J is the saw, bolted to the forward end of rod H.

K is a log upon which the saw operates.

The operation is as follows: The machine is brought up to the log and the saw is laid across it and a reciprocating motion given it by means of the crank-wheels E E' and intervening shaft, D, the pitman I, and rods H.

In order to change the vertical inclination of the saw, there is a lever, P, pivoted at k to the side of frame A. The forward end of this lever impinges under the pivoted bar F, and its rear end is provided with a spring-pawl, L, adapted to engage with a rack, l, on one of the legs B. By moving this lever the bar F can be raised or lowered and held at any suitable inclination, thus varying the inclination of the saw.

In Fig. 2 we show the application of the machine to sawing down standing trees. The saw, instead of being secured to the end of rod H in a vertical plane, is laid flat upon its top and pivoted by a pin, h, whereby it is adapted to be turned in a horizontal plane.

M is an arm bolted to the saw, and having a spring, m, attached to its projecting end. A strap, N, is connected with the end of the spring and with the pitman I near where it joins the crank-pin. The tendency of this spring is to keep the saw against the bottom of the cut, and when its tension slackens the movement of the machine to one side will renew it.

In Fig. 3 we show the machine inverted and ready for transportation. The securing-bolt of the saw is loosened, and the saw is turned back alongside of the frame, and its end is fitted on a pin, n, on said frame and secured by a cross-pin. The frame is turned over, and is supported on wheels E E', the legs B being up in the air. The handles C are then grasped, and the machine is rolled along on wheels E E'.

It is obvious that the length of stroke of the saw may be varied by adjusting the crank-pin $e'$ to or from the center, and the power may be varied by adjusting the crank-handle $e$ in similar manner. To adapt the machine for leveling up on uneven ground, the legs B should be made extensible.

Having thus described our invention, what we claim as new, and desire to secure by Letters Patent, is—

1. In a sawing-machine, the combination of a reversible self-supporting frame, the shaft D, mounted in its top, the crank-wheels E E', for the purpose set forth, on said shaft, the guide-bar F, and sliding rod H, having saw J, secured to its end, and the pitman I, connecting the crank-wheel E' with the rod H, whereby a reciprocating motion is imparted to the saw, substantially as herein described.

2. In a sawing-machine, the reversible self-supporting frame A, having rear legs, B, and forward handles, C, in combination with the shaft D, wheels E E', having when the frame is upright the function of cranks, and when inverted that of rolling wheels, the sliding rod H, with saw attached, and pitman I, connecting wheel E' with rod H, substantially as and for the purpose herein described.

3. In a sawing-machine, the frame A, having rear legs, B, and forward handles, C, in combination with the connected crank-wheels E E', the guide-bar F, pivoted to one of the rear legs, and having sockets $f$, the sliding rod H, fitted in said sockets, and having the saw attached, the pivoted lever P, for adjusting the bar F vertically, and the pitman I, for imparting a reciprocating motion to the rod H and saw, substantially as herein described.

4. In a sawing-machine, the frame A, having rear legs, B, and forward handles, C, in combination with the connected crank-wheels E E', the guide-bar F, pivoted to one end of the rear legs, and having sockets $f$, the spring-holding strip G, pivoted to the rear leg and connecting with the forward end of bar F, one of the forward handles passing between said strip and bar, the sliding rod H, having the saw attached, the lever P, pivoted to the side of the frame, its forward end bearing under bar F, and its rear end provided with a pawl adapted to engage with a rack on the rear leg, and the pitman I, all arranged and operating substantially as and for the purpose herein described.

5. In a sawing-machine, the crank-wheel E', pitman I, and reciprocating rod H, in combination with the saw J, pivoted to the end of rod H, and adapted to move on its pivot in a horizontal plane, the arm M on the saw, and the spring $m$, and strap N, connecting the arm with the pitman I, substantially as herein described.

In witness whereof we have hereunto set our hands.

WILLIAM M. McFARLIN.
CHARLES $\times$ PLUM.
his
mark.

Witnesses:
H. H. SHUFFLETON,
ELIJAH GROOM.